United States Patent [19]

Anderson

[11] 4,026,000
[45] May 31, 1977

[54] APPARATUS FOR PRODUCING ENVELOPED BATTERY PLATES

[75] Inventor: Kenneth Arnold Anderson, Milwaukee, Wis.

[73] Assignee: Globe-Union Inc., Milwaukee, Wis.

[22] Filed: July 15, 1976

[21] Appl. No.: 705,537

[52] U.S. Cl. .............................. 29/730; 29/623.1; 29/623.4; 156/73.4; 156/484; 270/68 A
[51] Int. Cl.² ......................................... H01M 2/14
[58] Field of Search ........... 29/204 R, 623.1, 623.4; 429/136, 138; 156/73.1, 73.4, 213, 217, 380, 483, 484, 485; 270/68 R, 68 A

[56]  References Cited
UNITED STATES PATENTS

| | | | |
|---|---|---|---|
| 2,373,082 | 4/1945 | Staelin | 156/484 |
| 2,934,585 | 4/1960 | Zahn | 429/139 |
| 3,481,596 | 12/1969 | Porth | 270/68 A |
| 3,989,579 | 11/1976 | Sheldon | 29/204 R X |

*Primary Examiner*—Carl E. Hall
*Attorney, Agent, or Firm*—David B. Smith; John Phillip Ryan

[57]  ABSTRACT

Apparatus for enveloping battery plates within porous separators and for feeding a separator sheet to form a fold at the approximate midpoint of the separator, simultaneously positioning a battery plate with an edge adjacent to the fold line, passing the plate and separator through rollers to press the separator against both sides of the battery plate, and passing the folded separator and enclosed battery plate through an ultrasonic sealing unit for sealing opposite edges of the separator to form an envelope. The apparatus includes a separator sheet dispenser for dispensing individual separator sheets into an elongated passageway. The end of the passageway is blocked so that a separator reaching the stopping point buckles to form a fold at the approximate midpoint of the separator. A plate dispenser is provided for feeding a battery plate adjacent to the fold line of the separator and rollers are provided for receiving the plate and separator and compressing the sides of the separator against the opposite sides of the battery plate. The rollers feed the folded separator and battery plate through an ultrasonic sealing device for sealing opposed edges of the separator to form an envelope around the battery plate.

12 Claims, 13 Drawing Figures

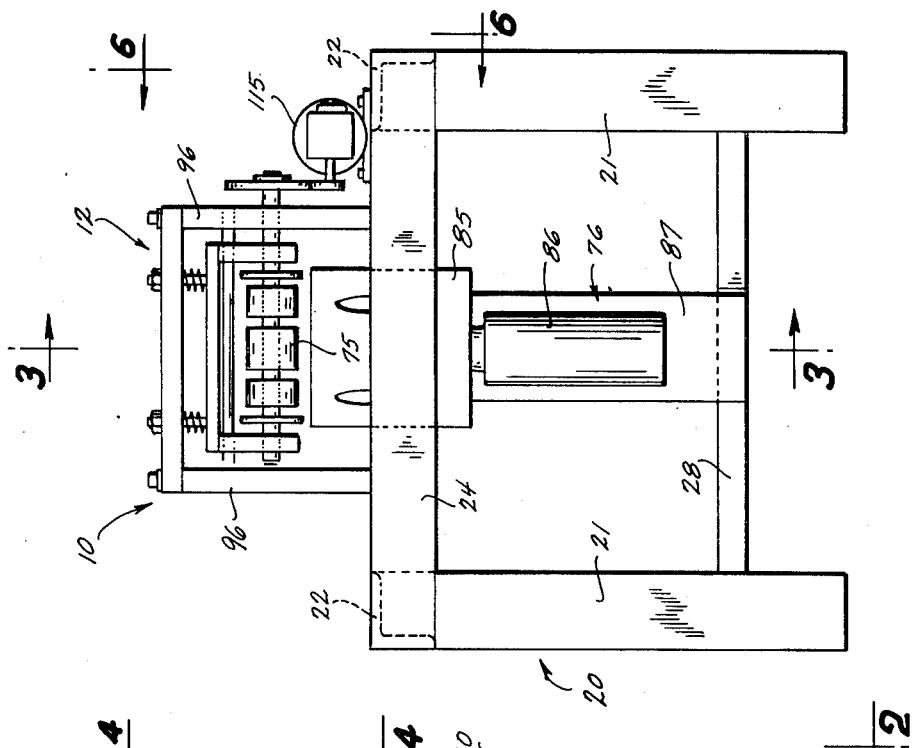

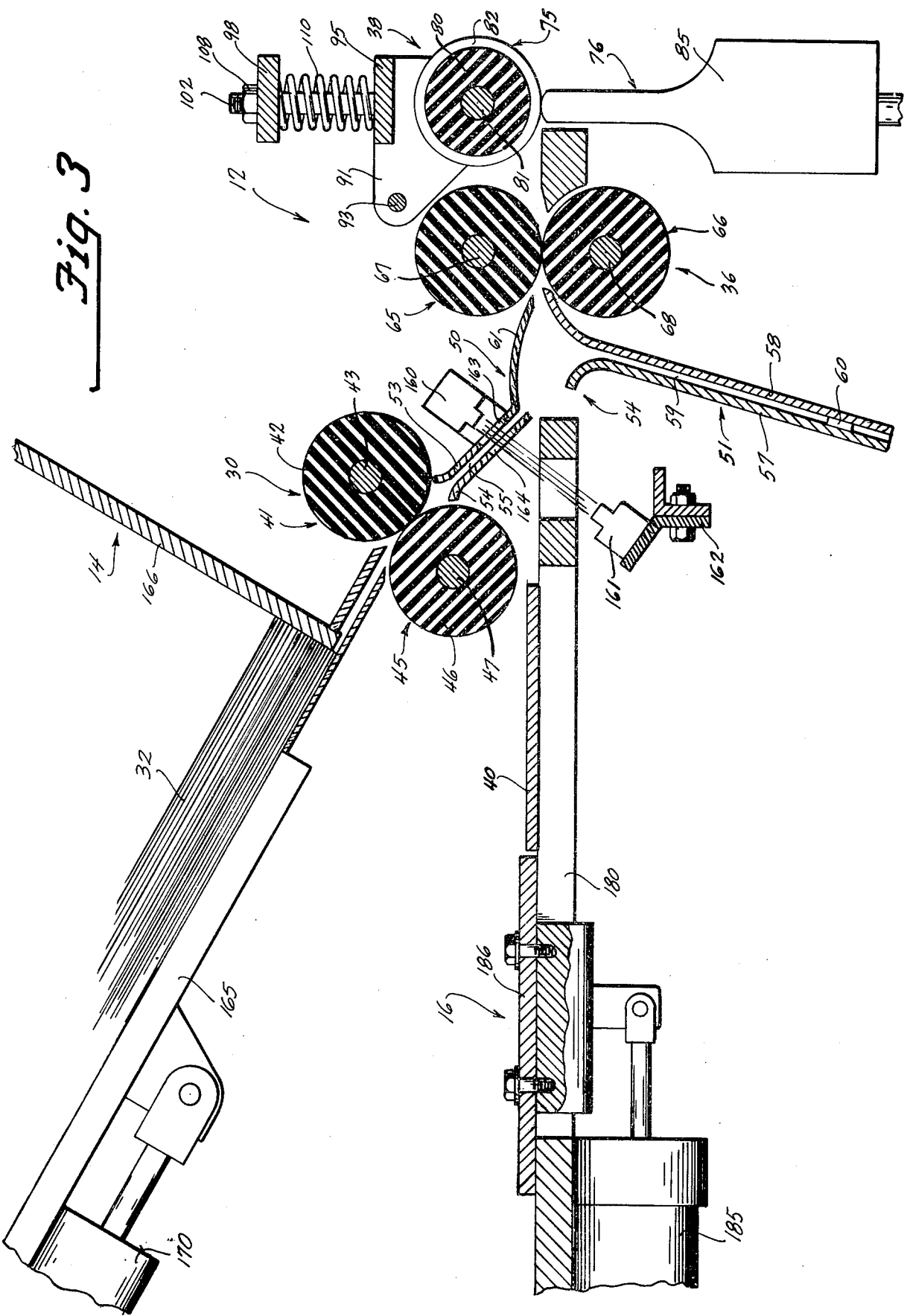

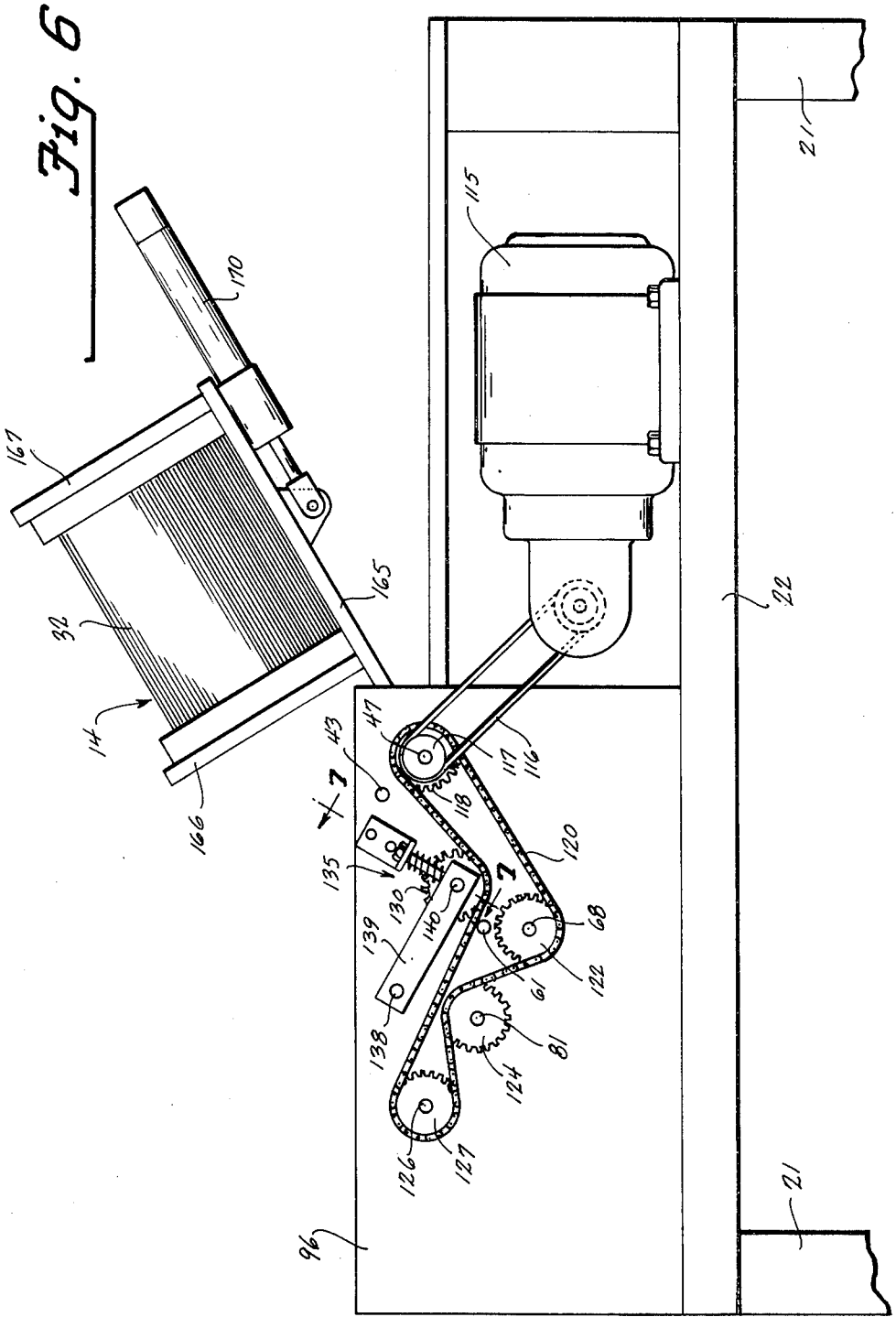

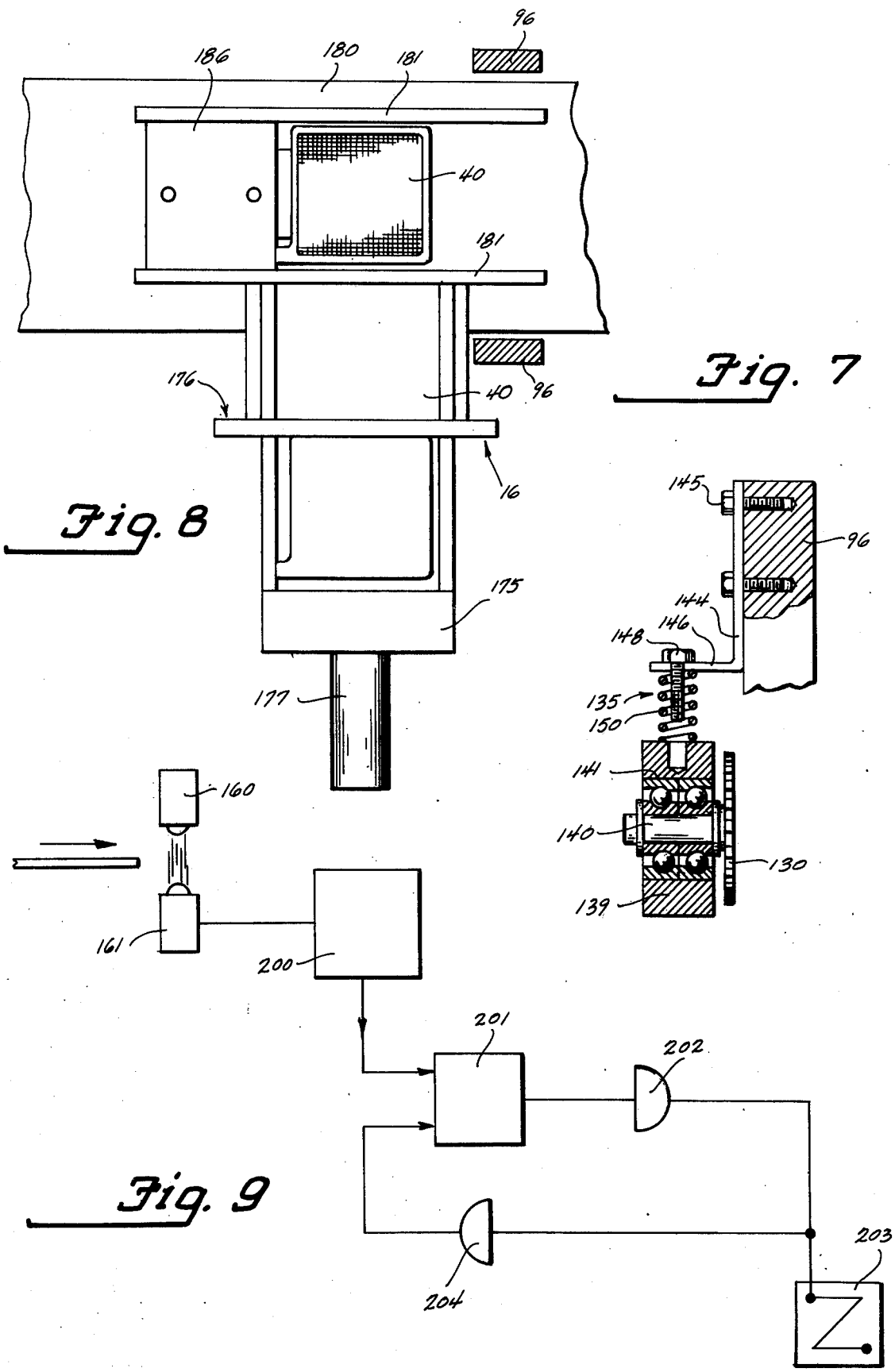

APPARATUS FOR PRODUCING ENVELOPED BATTERY PLATES

BACKGROUND OF THE INVENTION

This invention relates to apparatus for producing enveloped battery plates where the envelope comprises a porous separator having sealed edges along at least the bottom and sides of a battery plate.

Conventional plate-type secondary storage batteries typically comprise a plurality of positive and negative plates with interspersed porous, nonconductive separators. A plurality of plates are typically mounted within a battery cell containing an electrolyte solution. Recently the battery industry has been making inroads into the manufacture of batteries requiring little or no maintenance, specifically batteries which do not require the owners to add water to the batteries in order to maintain the level of electrolyte over the useful service life of the battery. While it is virtually impossible to totally prevent the loss of electrolyte during normal battery usage, it is desirable to minimize the rate at which the water in the electrolyte solution is depleted. Loss of electrolyte arises primarily through evaporation and gassing which occurs during charging of the batteries in which the water is subject to electrolysis producing hydrogen and oxygen gases which are then vented from the battery. The gases may also carry evaporated water vapor.

Typical lead acid batteries utilize lead-antimony alloys because of the effects of antimony on the physical characteristics of the lead material employed as battery grids. A disadvantage of antimonial lead alloys is that they generally result in increased gassing rates and the resultant increased loss of electrolyte solution. To overcome the disadvantages of the lead antimonial systems, the so-called low-or no-maintenance type batteries employ other lead alloys such as lead-calcium as grid materials. While the lead-calcium alloys reduce the rate of gassing and thereby reduce the rate of depletion of electrolyte, there are several disadvantages to the lead-calcium systems. For example, lead-calcium alloys are subject to creep or growth of the plates during usage. If the plates grow excessively, this may result in shorting of the battery by the growth of the plates or grid materials beyond the extent of the separator material whereby shorting may occur. Additionally, such grid materials are subject to "mossing" or "treeing"effects whereby dendrites of lead grow to form fine strands of conductive material which may extend around or through the separators and result in shorts between adjacent plates.

Conventional lead acid batteries typically include mud rests or upraised partitions in the bottoms of the batteries for supporting the plates and also for providing a space where particles of the battery paste which become dislodged from the plates can settle to the bottom of the battery. This precipitation of the paste material results in a higher concentration of lead sulfate in the bottom of the battery which promotes the mossing or treeing effects near the bottom of the battery. The mud rests were necessary however to prevent the precipitating material from falling into a position between adjacent battery plates which would increase the tendency to short the battery plates.

The battery industry has recognized the foregoing problems and attempted to provide enveloped battery plates which would retain the particles of lead paste within the confines of the enveloped separators while at the same time acting to reduce the tendency of the batteries to tree or moss as previously described. U.S. Pat. No. 2,934,585 issued to Zahn on Apr. 26, 1960 shows an enveloped battery plate which eliminates the need for mud rests in the bottom of the batteries. The adjacent separators forming an envelope are heat sealed along the edges to form an enclosed envelope. U.S. Pat. No. 3,013,100 issued to Mendelsohn et al. on Dec. 12, 1961 also shows an enveloped battery electrode where the separators are coated with a polyvinyl alcohol solution for forming a sealing surface between adjacent separator surfaces. U.S. Pat. No. 3,900,341 issued to Shoichiro et al. issued Aug. 19, 1975 also shows a folded separator, however, the edges of the separator are not completely sealed and allow space along the sides and bottom for escape of paste material. A sealant is applied to the edges of the separator to be sealed by heat sealing. U.S. Pat. No. 3,703,417 issued to Rosa et al. on Nov. 21, 1972 shows a plate envelope formed by two separators having edge sealant applied consisting of neophrene and polysulfone. The edges are heat sealed with an impulse sealer after the sealant is dried. U.S. Pat. No. 3,251,723 issued to McAlpine et al. on May 17, 1966 shows an apparatus for sealing pairs of separators along their edges to form envelopes around battery plates by a heat sealing method also.

The use of enveloped battery plates to permit elimination of the mud rests, enables a greater amount of electrolyte to be present over the tops of the battery plates. This prevents the plates from being exposed to the air until the electrolyte is depleted to a lower level than in conventional batteries thereby adding to the service life.

While the foregoing prior art patents recognize some of the desirable attributes of enveloped battery plates, there remain some problems with adapting their teachings to mass production techniques suitable for use in producing automotive batteries. Recently separator materials have become available which are made of heat sealable plastic such as polyethylene, polypropylene or vinyl such as polyvinyl chloride. While these separators may be heat sealed without the use of secondary adhesives or other material applications as suggested by some of the foregoing patents, they are subject to material degradation if the heat is improperly applied. Heat sealing may involve the use of external heat such as platens applied to the external surfaces of the separators to be sealed along the joint interfaces. This method of heating requires carefully controlled temperatures since the heat must be transferred all the way through the separator material in order to soften the separator sufficiently to result in bonding. This process is also relatively slow for mass production techniques.

SUMMARY OF THE INVENTION

It is an object of the invention to provide an improved apparatus for forming enveloped battery plates.

It is a further object of the invention to provide an improved apparatus for producing enveloped battery plates which is adaptable to mass production techniques in battery manufacture.

A further object of the invention is to provide and an apparatus apparatus for sealing battery plate envelopes which avoids degradation of the battery plate separator material.

Other objects and advantages of the invention will become apparent from a description of the method preferred embodiment of the invention which follows.

The invention basically comprises apparatus for producing enveloped battery plates in which a heat sealable separator sheet is fed into an elongated passageway against a positive stop whereby the separator buckles to form a fold at the approximate midpoint of the separator material, inserting a battery plate adjacent the fold line, passing the separator and battery plate through rollers to press the separator adjacent the opposite sides of the battery plate, and passing the folded plate and separator through a sealing device for sealing the opposite edges of the separator adjoining the fold line. The preferred apparatus for carrying out the foregoing method provides a dispenser for feeding individual separator sheets into an elongated passageway having a positive stop therein. After the separator sheet contacts the positive stop, the sheet will buckle to form a fold line at the approximate midpoint of the separator. A plate dispensing device is provided for directing a battery plate adjacent the fold line of the separator. Rollers are provided for completing the fold of the separator and pressing it into the opposite sides of the battery plate. The rollers feed the folded separator and battery plate through a sealing device for continuously sealing the opposite edges of the fold separator adjacent the fold line to form an enveloped battery plate package.

DESCRIPTION OF THE DRAWINGS

FIG. 1 is a side elevational view of an apparatus according to the invention;

FIG. 2 is a view taken along line 2—2 of FIG. 1;

FIG. 3 is a view taken along line 3—3 of FIG. 2;

FIG. 6 is a view taken along line 6—6 of FIG. 2;

FIG. 7 is a view taken along line 7—7 of FIG. 6;

FIG. 8 is a view taken along line 8—8 of FIG. 1;

FIG. 9 is a schematic diagram of the control circuit employed with the apparatus according to the invention.

DESCRIPTION OF THE PREFERRED EMBODIMENT

Figure 5:
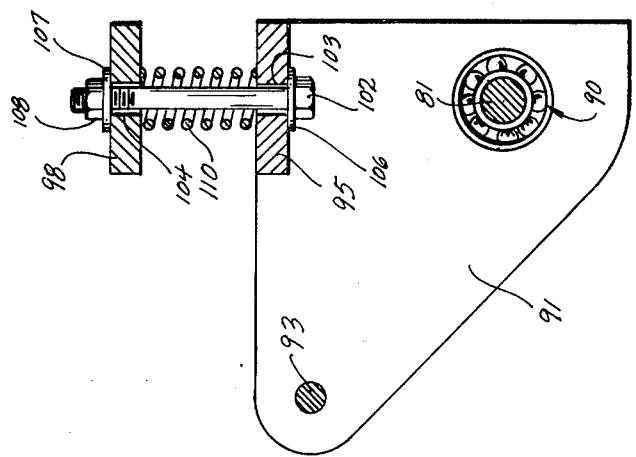
FIG. 5 is a view taken along line 5—5 of FIG. 4.

Referring now to FIGS. 1 and 2, a plate enveloping apparatus 10 according to the invention includes an enveloper assembly 12, a separator dispenser assembly 14 and a battery plate feeding assembly 16. The enveloping assembly 12, separator dispenser assembly 14 and plate feed assembly 16 are all supported on a suitable structural framework 20 which includes upstanding legs 21, side rails 22 and cross rails 24 which are suitably interconnected by welding for example. Lower side and cross rails 26 and 28 respectively may also be provided.

Referring now to FIGS. 1-7, the enveloper assembly 12 will be described. As best seen in FIG. 3, enveloper assembly 12 includes a first pair of separator feed rollers 30 which receive individual separators 32 from separator dispenser 14 and direct them into a folding section 34 where the separators 32 are folded. During folding, the separators 32 are directed to a second pair of pressing rollers 36 which direct the folded separator through a sealing section 38. During the folding of each separator, a battery plate 40 is directed edgewise from the battery plate feed apparatus 16 to a position adjacent the fold line of the separator and is simultaneously picked up by the rollers 36. The separator feed rollers 30 comprise a first horizontally extending idler roller 41 having a resilient outer portion 42 suitably supported on a central shaft 43. A second roller 45 is rotatably mounted parallel to the first roller 41 and also includes a resilient outer shell 46 supported on a drive shaft 47. Rollers 41 and 45 are positioned to receive individual separators from the separator dispensing apparatus 14 between them and direct them downwardly into the separator folding apparatus 34.

The separator folding assembly 34 embodies principles utilized in the paper handling industry and includes a first or upper guide assembly 50 and a second or lower guide assembly 51. The upper guide assembly 50 comprises a pair of spaced parallel plates 53 and 54 which define a passageway 55 extending downwardly from a point adjacent the interface between rollers 41 and 45 toward the lower guide assembly 51. Plates 53 and 54 may have their leading edges curved slightly to diverge and present an increased opening of the passageway 55 to facilitate entry of separators 32 from the rollers 41 and 45 into the passageway 55. As the separators leave the rollers 41 and 45 and proceed through the passageway 55 they are directed to the lower guide assembly 51 which comprises a pair of spaced guide plates 57 and 58 defining a lower elongated passageway 59 the plane of the plates 57 and 58 extends at an angle of approximately 105° relative to the plane of passageway 55. A stop member 60 is provided at the lower end of passageway 59 and extends between plates 57 and 58 for limiting the extent of travel of the separators within passageway 59. At the upper portion of the lower guide assembly 51, guide plates 57 and 58 are curved outwardly to diverge and form an enlarged inlet opening into passageway 59. As a separator is fed by rollers 41 and 45 through passageway 55 of the upper guide assembly 50 and into passageway 59 of the lower guide assembly 51, the separator travel will be limited by the positive stop 60 which will cause the separator to buckle in a direction away from rollers 30. An upper plate 61 is attached to guide plate 53 and constrains the buckling of the separators and directs them toward roller pair 36.

The second roller pair 36 comprises a horizontally extending upper roller 65 and lower roller 66 both of which have resilient outer shells and are supported on suitable shafts 67 and 68 respectively. The lower shaft 68 is driven in a clockwise direction as viewed in FIG. 3. As the separator 32 fed into the lower guide assembly 51 buckles in the direction of rollers 65 and 66, a battery plate 40 is fed edgewise by the plate feed assembly 16 to a point adjacent the buckled portion of the separator 32. Rollers 65 and 66 engage the folded separators and plates and convey them to the right as viewed in FIG. 3 while at the same time pressing the separators adjacent the opposite sides of the battery plates 40. Each folded separator 32 containing a battery plate 40 is then fed by rollers 65 and 66 toward the sealing assembly 38.

Figure 4:
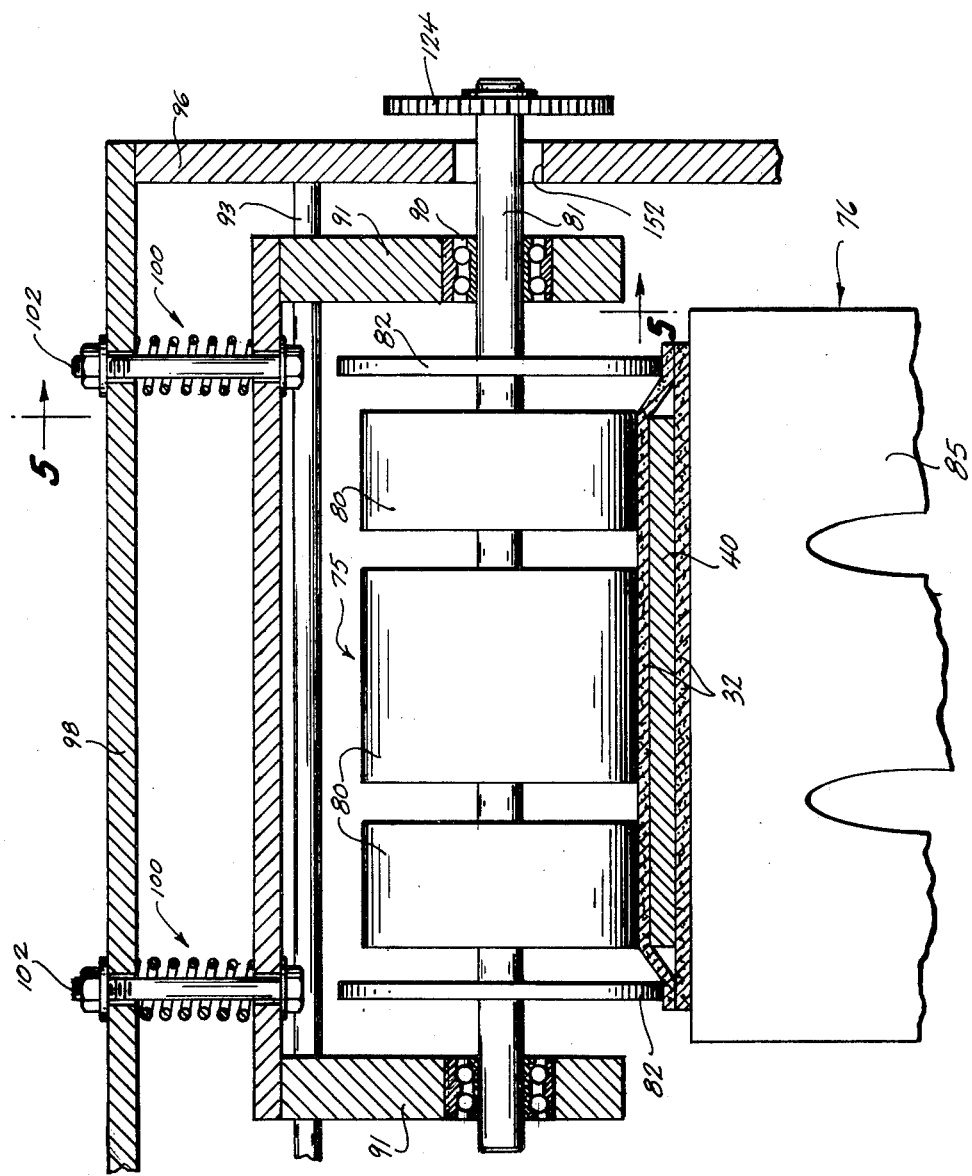
FIG. 4 is a view taken along line 4—4 of FIG. 1.

The sealing assembly 38 is best seen in FIGS. 2–5 and includes a sealing roll assembly 75 which is rotatably mounted over an ultrasonic sealing unit 76. The roll assembly 75 and sealing unit 76 are positioned downstream of rollers 65 and 66 to receive the folded plate and separators. Roll assembly 75 includes a plurality of resilient rolls 80 which are mounted on a shaft 81. The rolls 80 are positioned inwardly of a pair of spaced rigid sealing discs 82 which are also supported on shaft 81 and spaced approximately equal to the width of the folded separator sheets 32. The peripheral portion of each sealing disc 82 are spaced closely above the upper surface of a sealing horn 85 which forms a part of the sealing apparatus 76. The horn 85 is vibrated at an ultrasonic frequency by a vibrating unit 86 mounted on a vertically extending plate 87 suitably secured to the frame assembly 20. As a folded separator 32, as shown in FIG. 4, passes between the roll assembly 75 and the sealing horn 85, the outer edges of the separator 32 are compressed between the discs 82 and the ultrasonic horn 85. The vibrations from the horn are thus transferred to the interface between the edges of the separator 32 resulting in generation of sufficient heat to soften the separator material which is made of a porous heat sealable material, such as polypropylene, etc., whereby the edges of folded separator 32 are sealed to form an envelope containing battery plate 40.

Referring now to FIGS. 3–5, it will be seen that shaft 81 of the roll assembly 75 is rotatably supported in bearings 90 mounted within a pair of spaced vertically extending bracket members 91 which in turn are pivotally supported by a shaft 93. The upper portions of brackets 91 are tied together by a cross bar 95 whereby roll assembly 75 is free to pivot around shaft 93. A pair of spaced vertically extending side plates 96 enclose the envelope assembly 12 and a second cross bar 98 is provided across the top of the side members 96 in a spaced relationship above cross bar 95. A pair of spring biasing assemblies 100 are provided between the bars 95 and 98 to bias the bar 95 and roll assembly 75 downwardly toward horn 85. The biasing assemblies are similar and each comprise a vertically extending bolt 102 which is slidably disposed within apertures 103 and 104 formed in the cross bars 95 and 98 respectively. A washer 106 is positioned between the head of bolt 102 and the bottom of plate 95 and a second washer 107 is held by a nut 108 against the top portion of the upper cross bar 98 whereby the extreme downward movement of roll assembly 75 is limited. A compression spring 110 is disposed around bolt 102 between cross bars 95 and 98 whereby the lower cross bar 95 may pivot upwardly toward the fixed upper cross bar 98 against the resilient spring pressure of spring 110. Therefore, as seen in FIG. 4, the entire roll assembly 75 is biased downwardly by springs 110 toward the sealing horn 85, however, minor dimensional variations in the battery plates 40 and separators 32 are accomodated by permitting the roll assembly 75 to pivot upwardly against the springs 110 if necessary.

Referring now to FIGS. 1, 2, 6 and 7, the envelope assembly 12 is all housed between the upstanding side plates 96 supported on the top of framework 20. As shown in FIG. 1, shafts 43, 47, 67, 68 and 93 are all rotatably journaled in one side plate 96. As seen in FIG. 6, on the opposite side plate 96 a drive motor 115 is provided for driving shafts 47, 68 and 81. The motor 115 powers a drive belt 116 which drives a pulley 117 attached to shaft 47 of the separator feed rolls. A sprocket 118 is also attached to shaft 47 adjacent pulley 117 and powers a drive chain 120. The chain 120 is reeved under a sprocket 122 attached to shaft 68 of the second roller assembly 36, and extends up and over a sprocket 124 attached to the end of shaft 81 of the sealing roll assembly which extends through side plate 96. An idler shaft 126 is provided with a sprocket 127 around which chain 120 passes. The chain 120 continues beneath a pre-loading sprocket 130 and back to the drive sprocket 118. A pre-load assembly 135 is associated with the pre-load sprocket 130 for taking up slack in chain 120 and compensating for movements of the feeding roller shaft 81. Pre-load assembly 135 is seen in FIGS. 6 and 7 to include a fixed shaft 138 which pivotally supports a lever arm 139 on which sprocket 130 is rotatably journaled on shaft 140 mounted in bearings 141. A bracket 144 is attached to side plate 96 by means such as bolts 145 and has an outwardly extending leg 146 extending above and spaced from the top of the lever arm 139. A bolt 148 is secured to the leg 146 and extends downwardly through the leg 146 toward lever arm 139. A compression spring 150 is provided around bolt 148 between the bottom portion of leg 146 and the upper portion of lever arm 139 for biasing the lever arm 139 downwardly which in turn carries sprocket 130 resiliently into contact with the chain 120. It will thus be appreciated that if the feeding roller shaft moves in such a manner in which to loosen the tension on chain 120, the slackening of the chain 120 will be compensated by spring 150 urging lever arm 139 into further engagement with the chain 120 to take up any slack. As seen in FIG. 4, sealing roll shaft 81 extends through an enlarged aperture 152 inside plate 96 to permit limited vertical movement of the shaft 81 and roller assembly 75.

As seen in FIG. 3, a light 160 is mounted adjacent the upper portion of the first guide assembly 50 and a photo cell unit 161 is positioned on the lower side of guide assembly 50 on a suitably mounted bracket 162 mounted within the framework 20. The photo cell 161 is aligned with apertures 163 and 164 through the upper guide plates 53 and 54 respectively such that the light beam will be interrupted when a separator is directed by rollers 41 and 45 through the guide channel 55. The purpose and function of the photo cell 161 will be explained hereinafter.

Referring now to FIGS. 1, 3 and 6, the separator dispenser assembly 14 is seen to include a base plate 165, suitable upstanding members 166 and 167 which form a hopper like arrangement for retaining a stack of separator sheets 32. Beneath the base plate, a suitable device such as a neumatic or hydraullic cylinder 170 may be provided which is coupled to a suitable stripper plate in a conventional manner. Actuation of the cylinder will cause the lowermost separator sheet to be fed from the dispenser 14 toward the first set of rolls 30. Such a method of feeding is well known in the art and any suitable arrangement may be provided. Similar devices are shown in U.S. Pat. No. 2,908,377 to Winkel dated Oct. 13, 1959, U.S. Pat. No. 2,930,508 to McAlpine dated Mar. 29, 1960 and 2,680,510 to Donath dated June 8, 1954 as well as 2,897,950 to Reed dated Aug. 4, 1959. While it will also be apparent from these prior art patents that instead of a cylinder type actuating mechanism, a suitable mechanical linkage could be provided. Additionally, a vacuum could be provided to the lowermost sheet for insuring that it is drawn down into proper position for dispensing. These features are well known in the art and form no part of the present invention and need not be described in further detail.

Similarly, referring to FIGS. 3 and 8, the plate feed assembly 16 includes a base plate 175 with a similar hopper arrangement 176 for retaining a stack of battery plates 40. A similar cylinder 177 may be provided for feeding plates 40 unto a second base plate 180 which extends toward the enveloping assembly 12. Suitable guide bars 181 are provided for receiving the plates 40 and a second cylinder 185 may be provided for actuating a pusher plate 186 for pushing the plates into the envelope assembly 12. Again, feed devices of this type are well known in the art and need not be described in further detail. Additionally, a suitable mechanical type feeding arrangement could also be provided in place of the cylinders 177 and 185.

A schematic diagram of the control circuit for use with the apparatus according to the invention is shown in FIG. 9. Upon interruption of the beam from light 160, photo cell 161 sends a signal to an amplifier 200 which in turn sets a control module 201. An output signal from control module 201 goes to a time delay module 202 which sends a signal, after a predetermined time delay, to a solenoid 203 which in turn controls a feeding of battery plates. The output signals from the time delay module 202 in turn activates a second time delay module 204, which after a predetermined time interval, resets control module 201 to ready the circuit for a repetition of the foregoing steps.

Figure 10:
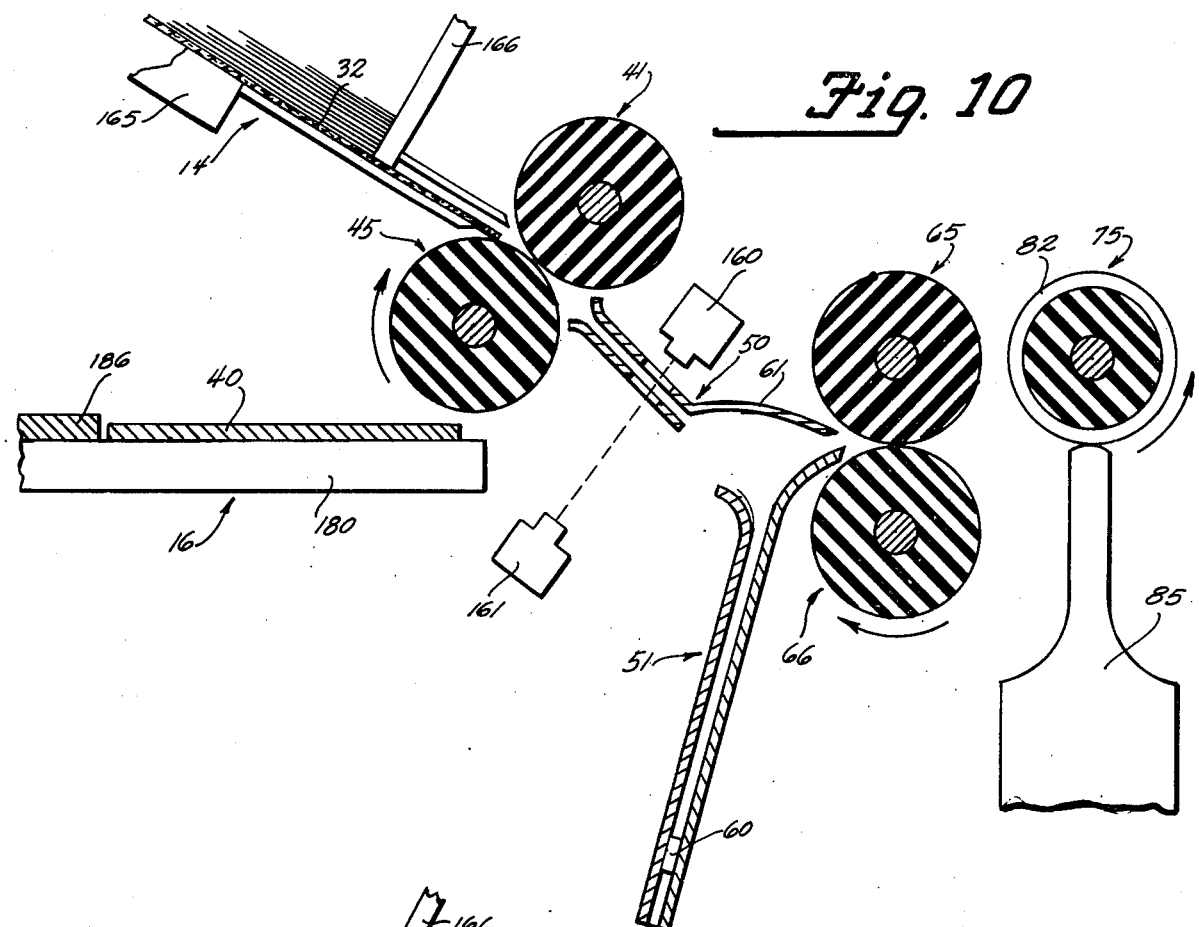
FIGS. 10, 11, 12 and 13 schematically depict the various stages involved during operation of the apparatus to effect the method according to the invention.
Figure 11:
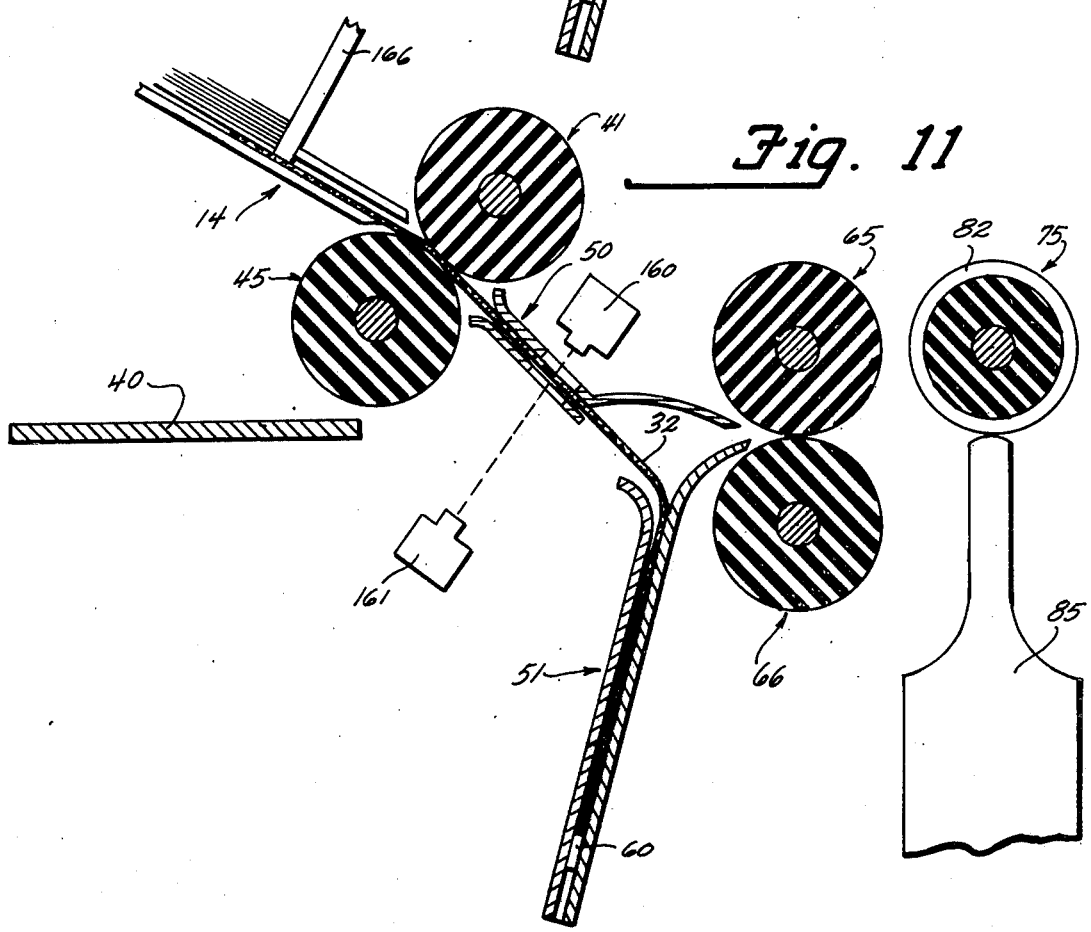
Figure 12:
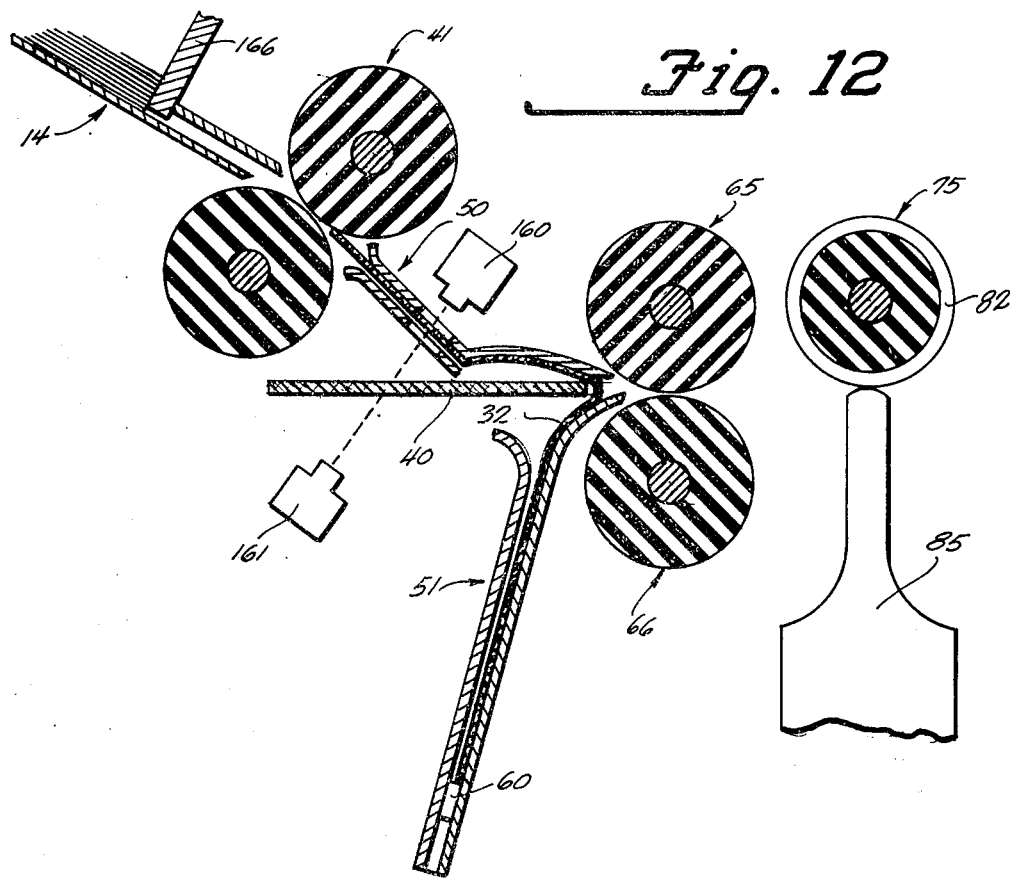
Figure 13:
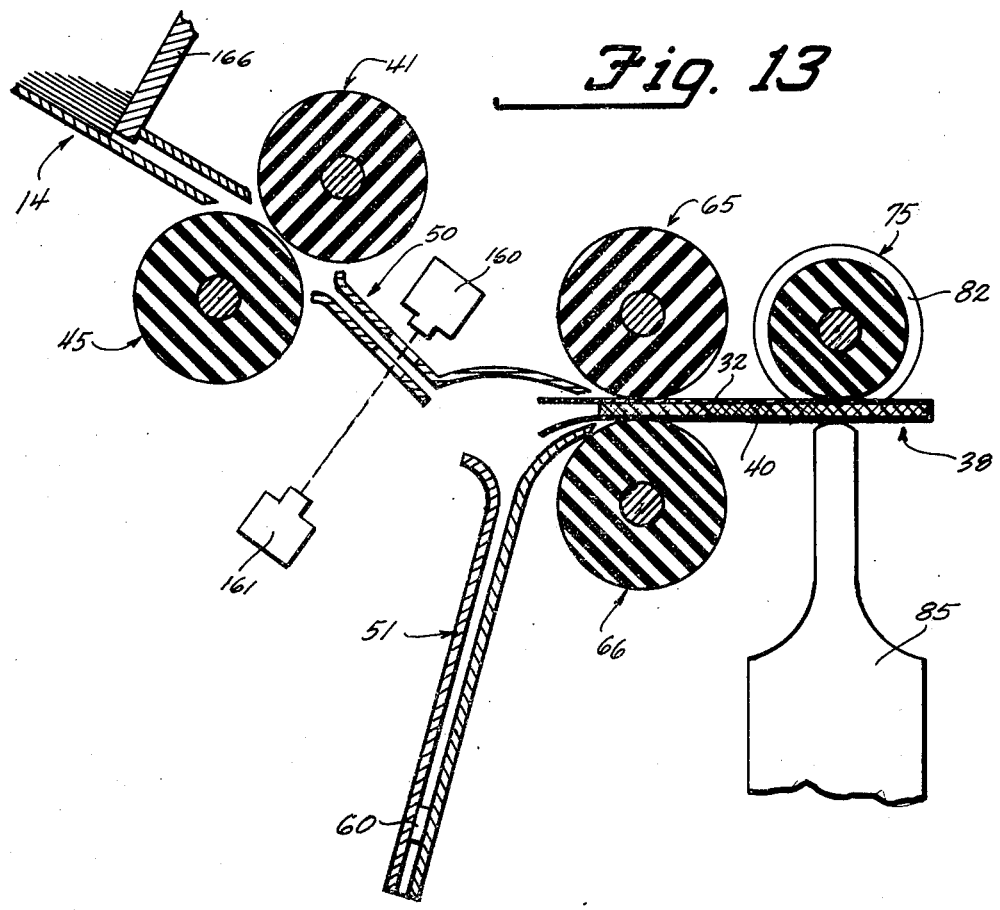

Referring now to FIGS. 10–13, the sequence of operation of the enveloping apparatus will now be described. The figures represent the time progression of steps in forming an enveloped plate and separator starting with FIG. 10. As shown in FIG. 10, a separator sheet 32 is ready for feeding from the separator feed apparatus 14 to the rollers 41 and 45. A battery plate 40 is in place on the plate feed apparatus 16 as well. At this point in time rollers 45 and 66 are driven in a clockwise direction while the sealing roller assembly 75 is driven in a counterclockwise motion. After feeding of the separator sheet 32 into the rollers 41 and 45, the sheet 32 will be forced through the upper guide plates 50 and down into the lower guide assembly 51 until the sheet 32 reaches positive stop 60 as shown in FIG. 11. As the rollers 45 and 41 continue to drive the separator sheet with its lower or leading against positive stop 60, the separator sheet 32 will buckle in the direction of rollers 65 and 66 as seen in FIG. 12. Meanwhile the passage of the separator sheet through the upper guide assembly 50 interrupts the light beam from light 160 to photo cell 161 resulting in activation of the plate feed assembly 16 to feed a battery plate 40 laterally toward the buckled portion of the separator sheet 32 whereby the plate 40 and buckled portion of separator sheet 32 enter between rollers 65 and 66 as shown in FIG. 12. As seen in FIG. 13, rollers 65 and 66 propel the plate 40 and separator 32 through the sealing roll assembly 75 and ultrasonic horn 85 while at the same time pressing the separator sheet into contact with opposed surfaces of the battery plate 40. As the folded plate and separator pass between the sealing roll assembly 75 and horn 85, the sealing discs 82 will press the edges of the separator sheet 32 against the horn 85 whereby the ultrasonic vibration causes a heating, softening and sealing of the separator sheet edges. The resilient rolls 80 of the sealing roll assembly 75 simultaneously engage the intermediate surfaces of the separator and maintain if flat against the battery plate 40. After sealing, the battery plate 40 and enveloped separator 32 will be discharged from the sealing section 38 for suitable further processing and handling.

While one embodiment of the invention has thus been described, those skilled in the art will realize that variations are possible. For example, in place of a photo cell, other sensors or timing devices could be used. Various drive arrangements are also possible. Therefore the scope of the invention is not to be limited by the foregoing description but is to be taken solely from an interpretation of the claims which follow.

I claim:

1. Apparatus for enveloping battery plates in heat sealable separators, said apparatus comprising:
separator dispensing means for sequentially dispensing separators from a stack of heat sealable separator sheets;
first roller means supported adjacent said separator dispensing means for receiving said separators from said dispensing means and directing them away from said dispensing means,
folding means supported adjacent said first roller means for receiving said separators from said first roller means and folding said separators, said folding means comprising first guide means for guiding said spearators along a first path of movement, second guide means spaced from said first guide means for receiving said separators from said first guide means and guiding said separators along a second path of movement angularly displaced from said first path, stop means for limiting the travel of said separators in said second guide means to cause said separators to buckle forming a buckled portion in said separators, and second roller means for receiving the buckled portion of said separators and for folding said separators and directing them away from said folding means;
plate dispenser means disposed ahead of said folding means for directing battery plates edgewise into said folding means and between the folded portions of said separators and into said second roller means whereby said separators are folded against opposite sides of said battery plates; and
ultrasonic sealing means for receiving said folded separators and enclosed battery plates from said second roller means and for heat sealing at least the edges of said separators adjacent the fold line of said separators to from an envelope.

2. Apparatus as set forth in claim 1 including:
sensing means associated with said folding means for detecting the presence of a separator in said folding means; and
control means responsive to said sensing means for actuating said plate dispenser means after said sensing means detects a separator in said folding means.

3. Apparatus as set forth in claim 2 including:
drive means for rotatably driving at least one roller of each said first and second roller means.

4. Apparatus as set forth in claim 3 wherein:
said sealing means comprises an ultrasonically vibrating member having a generally straight upper surface over which said folded separators and enclosed battery plates pass; and
third roller means spaced above and rotatable about an axis parallel to said upper surface, said third roller means having disc means for forcing the edges of said folded separators into contact with each other and with said vibrating member to cause heating and fusion of adjacent portions of said separators along their edges.

5. Apparatus as set forth in claim 4 wherein:

said sensor means comprises a photo cell and light source.

6. Apparatus as set forth in claim 5 wherein:

said first guide means comprises a pair of spaced parallel plates defining said first path of movement; and said second guide means comprises a pair of spaced parallel plates defining said second path of movement.

7. Apparatus as set forth in claim 6 wherein:

said first path is disposed at one angle of approximately 105° relatively to said second path.

8. Apparatus as set forth in claim 2 wherein:

said sensor means comprises a photocell and light source.

9. Apparatus as set forth in claim 1 including:

drive means for rotatably driving at least one roller of each said first and second roller means.

10. Apparatus as set forth in claim 1 wherein:

said sealing means comprises an ultrasonically vibrating member having a generally straight upper surface over which said folded separators and enclosed battery plates pass; and third roller means spaced above and rotatable about an axis parallel to said upper surface, said third roller means having disc means for forcing the edges of said folded separators into contact with each other and with said vibrating member to cause heating and fusion of adjacent portions of said separators along their edges.

11. Apparatus as set forth in claim 1 wherein:

said first guide means comprises a pair of spaced parallel plates defining said first path of movement; and said second guide means comprises a pair of spaced parallel plates defining said second path of movement.

12. Apparatus as set forth in claim 11 wherein:

said first path is disposed at one angle of approximately 105° relative to said second path.

* * * * *